June 30, 1936.  W. VON SAUER  2,046,008
ELECTRIC HEATING INSTALLATION
Filed Aug. 1, 1935
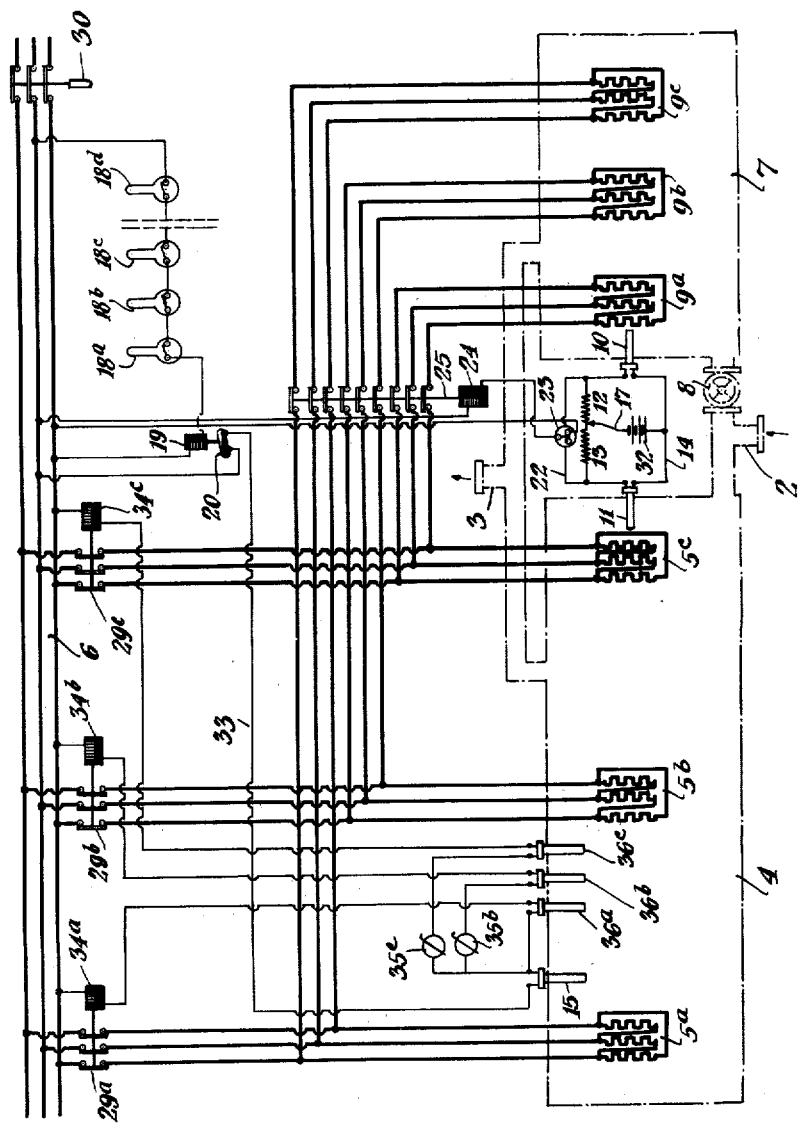
INVENTOR
Walter von Sauer
BY Louis Burgess
ATTORNEY Patented June 30, 1936

2,046,008

UNITED STATES PATENT OFFICE 2,046,008

ELECTRIC HEATING INSTALLATION

Walter von Sauer, Berlin, Germany

Application August 1, 1935, Serial No. 34,229
In Germany July 25, 1934

30 Claims. (Cl. 219—39)

The electrical heating of rooms as such does not primarily present a technical problem, but only an economic problem. Technically, in order to effect a heating which is entirely satisfactory in every respect it is only necessary to install resistance heaters, the efficiency and certainty in operation of which leaves nothing to be desired. Economically, systems of this kind have not been introduced in practice because the cost of electricity per kilowatt-hour far exceeds the cost of the quantity of coal by the combustion of which 860 heat units can be produced. This relatively high cost of electrical power arises from the policy which is generally pursued when fixing the rate of charges, according to which in the cost of each kilowatt-hour sold is included not only the direct cost of production for coal, oil, etc., but also a proportion of the capital outlay necessary for erecting the power station and the distribution network. The proportion of the cost attributable to capital outlay depends on the annual duration of the consumption of current and is smaller as the duration is longer.

A power station operates under the most favourable conditions when its plant is uniformly and fully loaded throughout the entire year. The conditions, however, in the case of public electricity supply companies are very far removed from this ideal state. Their load curves suffer throughout from typical evening peaks and night troughs which are mainly due to the necessity for light in the evening hours and the absence of an industrial load during the night, that is to say to factors which unfortunately cannot be eliminated in favour of a uniform sales distribution. In the daytime there is never, or seldom, any need for artificial illumination and by night the motors of industrial undertakings are seldom running: For these reasons electrical power supply undertakings must endeavour to fill up the troughs in their load curves by a consumpton of power which, in view of its nature, only occurs during the times of the troughs in the load curves, or which can, without disadvantage, be transferred to these times. To such consumers current is delivered at a price in which, in addition to the direct costs of production, is included only such a proportion of the fixed overhead costs of the power station (for example capital outlay) as is just allowable in view of the competition by other sources of energy which are available for these purposes. In this connection electric stoves or cookers and, in places where no boiler is present, hot water accumulators which are heated during the night come into question. These two kinds of current consumers can, however, only fill the troughs in the load curve to a limited extent, because the trough which occurs during the night is too deep as compared with the evening peak to be capable of being filled solely by current consumed in the production of hot water, and the electric cooker is scarcely used for longer than two hours between the morning and evening peak periods, that is to say during a period of 7 hours. Therefore, however great the extent to which electric cookers or night accumulators come into use, the load curve of the power station will always exhibit troughs which are far below the peaks, especially the winter evening peaks.

The electric power supply companies appear to have come to the conclusion that this is a state of affairs which they must put up with. They consider the peak load to be a necessary evil which can only be controlled to a limited extent without being entirely eliminated.

This assumption, however, is not correct, because it is based on a fallacy, namely on the theory that every unit sold must in any circumstances be saddled with at least a considerable part of the fixed overhead costs. This theory, however, has no longer any justification in those cases in which the sale to consumers who have to bear such a burden can unfortunately no longer be increased. When this point is reached, that is to say when all possibilities of fitting electric cookers and heat accumulators have been exhausted, then the remaining current required for filling the troughs in the load curve can be supplied to those consumers who, in view of competition from suppliers of other sources, cannot bear a higher charge, at the direct cost of production for coal, oil and the like, including a minimum profit, that is to say at a cost which is equal to about 1.25 times the direct cost of production.

One such source of electric power consumption is the electric heating of dwellings. In order to successfully compete with coal or oil heating, it is essential that the kilowatt price charged by the electric power companies be sufficiently low (in Germany, for instance, the price per kilowatt hour should not exceed 1.75 pfennigs). Such possibility of additional power consumption should not be ignored by the electric power supply companies at least in so far as it is used for entirely filling up the troughs in the load curve in comparison with the highest winter peaks, the more so since it represents an inductionless load and therefore increases the total power factor of the installation.

If the problem of electrical house heating be considered from this point of view, namely that of charges and economy, a technical problem now, however, arises, namely the question how a building fitted for electrical heating can be fully heated during each peak period of three hours' duration, which has been found by experience to occur in the mornings and evenings, without taking current from the mains, since this, in accordance with the preceding statements, can be delivered at the economical price in question only for filling the troughs in the load curve. It is obvious that the resistance heaters previously mentioned are not able to fulfil this requirement.

Now the present invention consists in an electrical heating installation which, in spite of an interruption in the supply of current of several hours' duration, enables an unaltered supply of heat units to be delivered to the rooms to be heated. The installation in accordance with the invention is characterized essentially by a first tank substituting an electrical flow heater which is arranged between the return and outward flow of a central heating installation and is hydraulically in parallel with a second tank substituting an electrically heated hot water accumulator which is heated while the flow heater is supplied with current and is employed for heating the building when the current is cut off. The size of this accumulator is calculated from the maximum hourly heat requirements of the house and from the duration of the interruption in the supply of current. For a building having a maximum hourly requirement of heat of 40,000 heat units and in which the current is cut off for three hours during the peak loads, the dimensions of the accumulator must be 5.5 cubic metres if it be assumed that there is the usual drop of 20° between the temperature of the outflowing and returning water in the central heating installation. A heat accumulator of this nature is of relatively small dimensions and cannot, therefore, be compared for example with a so-called night accumulator which, as has previously been proposed, is heated during the night and must be so large that it is able to deliver the entire heat required in the house during the whole day. A heat accumulator of this nature, if the possibility of generating high pressure steam, which is scarcely feasible in dwelling houses, be excluded, must have a capacity of 45 cubic metres if the hourly maximum heat requirement is 40,000 heat units and the temperature drop is 20° and therefore the cost of installation as well as the space occupied are increased to such an extent that it appears to be quite uneconomical from the outset.

The invention will now be explained with the aid of the accompanying drawing, which illustrates the invention diagrammatically and by way of example.

Referring to the drawing, 2 represents the return and 3 the outflow of an ordinary hot water central heating installation. Between the return 2 and the outflow 3 is interposed a tank or flow heater 4, the volume of which may amount to about 50 litres. It will be assumed that the maximum hourly heat requirement of the house amounts to 40,000 heat units. Consequently, the flow heater 4 must have an output of about 45 kilowatts. This output is derived from the mains 6 by means of heating elements which are preferably subdivided by means of relays or switches 29a, 29b, 29c into, for example three groups 5a, 5b, 5c, which can be individually switched on and off and each of which takes 15 kilowatts from the mains. The pipe system formed by the parts 2, 4 and 3 is bridged by the second tank or storage accumulator 7. The heating elements of the accumulator are preferably also divided into three groups 9a, 9b, 9c which are normally connected by the relay or switch 25 in parallel with the corresponding groups 5a, 5b and 5c respectively of the flow heater 4. Therefore, during the operating period of the heater 4, which may for example be of seven hours' duration, the accumulator 7 is heated by the same number of heating elements as are connected in the heater 4. If now during the peak period the current supply is disconnected by means of the time switch 30, the warm water present in the heater 4, owing to its small capacity of about 50 litres, will escape very quickly through the outflow 3 and the accumulator then begins to deliver its hot water and is again filled by the return flowing water which is about 20° cooler. The accumulator is, however, so dimensioned that the outflowing water is at a substantially constant temperature during the whole period when the current is cut off, that is to say the water which returns to the accumulator does not again flow out of the outlet 3. After the period when the current is cut off has ended, the two series of heating elements 5 and 9 are again connected to the mains. Then, owing to the small volume of the heater 4, the water in it, which has meanwhile become cooled down, is heated almost instantaneously and the heater alone again supplies the installation until the temperature of the water in the accumulator has reached the temperature of the water in the heater 4. If this occurs before the end of the seven hour period during which current is taken from the mains, then the accumulator acts until the end of this period as a second flow heater. In this way the water rising from the accumulator at the end of the period when current is being supplied can never have a higher temperature than corresponds to the heat requirements of the house at the time.

It may happen, however, that the heat requirements of a house are regularly smaller or even greater during the period when current is cut off than during the period when current is supplied. In order to take this requirement into account, there is provided, in accordance with the further feature of the invention, a differential switching arrangement which consists for example of two resistance thermometers 10, 11, one of which is located in the accumulator 7 and the other in the flow heater 4. The two thermometers are connected by means of the resistances 12, 13, the resistanceless conductor 14 and a source of current 32 to, for example a Wheatstone bridge, the diagonal 22 of which leads to a polarized relay 23 which controls the circuit of the holding coil or solenoid 24 of the relay or switch 25, and, therefore, governs the current taken by the series of heaters 9a, 9b, 9c of the accumulator 7. If an equalizing current flows in one direction through the diagonal 22 and the relay 23, the circuit of the holding coil or solenoid 24 is closed and the heaters of the accumulator 7 are connected in circuit. If, on the other hand, an equalizing current flows in the opposite direction, the heating of the accumulator is interrupted. By moving the conductor 17 leading to the source of current 32 along the two resistances 12 and 13, one can adjust as desired the resistance difference between the two thermometers 10 and 11, i. e. the temperature difference in the containers 7 and 4, at which the current flows in the diagonal 22 in the one or the other direction. If, for example, the conductor 17 is in the electrical centre of the resistances 12 and 13, then no current flows in the diagonal of the bridge when there is a temperature equality in the containers 7 and 4. If, on the other hand, as illustrated in the drawing, the conductor 17 is moved a little, to the right from the electrical centre, the bridge is in equilibrium when the resistance of the thermometer 10 is less than that of the thermometer 11, i. e. when the temperature of the accumulator 7 is lower than the temperature of the heater 4. In general, however, just the opposite state of affairs will be desired, namely that the water in the accumulator 7 has a slightly higher temperature than the water in the heater 4, because, as has been found by experience, the times when the current is cut off generally occur during the daylight hours when the need for heating is greatest. Therefore, the conductor 17 is displaced from the electrical centre of the resistances 12 and 13 to the left, and a valve 8 is provided in the pipe connecting the return 2 to the accumulator 7 in order to prevent the water in the accumulator, after reaching the temperature of the water in the heater 4, from taking part in the circulation. This valve can operate automatically and, for example, can be electromagnetically controlled in such a manner that it is closed after the installation has been connected to the mains and opens automatically when the current is disconnected.

The movement of the wire 17 along the resistances 12 and 13 preferably takes place over a scale on which the positive and negative temperature difference between the water in the accumulator 7 and that in the heater 4 is indicated. Since the two resistance thermometers are in a differential connection the flow of current in the diagonal 22 is in fact independent of the actual temperature and is only a function of the temperature difference. Further, the differential connection enables the thermometers 10 and 11 to be wound with ordinary copper wire instead of a wire made of precious metal and to be subjected to such high current loads that the differential flow in the diagonal 22 is relatively large, so that the relay 23 may be specifically less sensitive, that is to say it may be of more robust and, therefore, cheaper construction.

In order to prevent dangerously high temperatures from occurring in the flow heater 4, for example if the water circulation is throttled down too much, it is provided with an immersion control 15 which is connected in the common lead 33 of the holding coils or solenoids 34a, 34b, 34c of the relays or switches 29a, 29b, 29c and disconnects these coils as soon as the maximum temperature to which it has been set is reached. The accumulator 7, on the other hand, need not be fitted with such an immersion control because excessive temperatures cannot occur if it is correctly designed as regards its volume and capacity and means are provided to ensure that the switching on and off takes place at the proper times. If synchronous clocks are employed for the purpose this condition appears to be adequately satisfied.

The installation can be easily regulated in accordance with the air temperature desired in the rooms to be heated in such a manner that all rooms are heated up very quickly without excessively high temperatures occurring anywhere. For this purpose a thermostat 18a, 18b, 18c, 18d etc. is provided in each of the rooms to be heated. The thermostats close a connection when the temperature rises and are all in series with the holding coil 19 of a mercury switch 20 connected in the common lead 33 of the holding coils or solenoids 34a, 34b, 34c. Thus, when the thermostat 18a reaches its final temperature its contact closes. The radiator in the room in question can then be disconnected either by hand or can be automatically controlled by the thermostat 18a itself. Owing to this disconnection, the temperature of the circulating water will then increase so that the next thermostat, for example 18b, will close its contact more quickly, after which the radiator in the room in question is likewise disconnected without, however, affecting the consumption of current by the installation. The water temperature, therefore, now rises very rapidly and the remaining thermostats will, therefore, close their contacts still more quickly. Only when the last thermostat has responded is the circuit of the coil 19 closed, the mercury switch 20 is thereby opened, so that the coils 34a, 34b, 34c of the relays 29a, 29b, 29c are without current and the entire installation is disconnected. As soon, however, as the temperature in one room again falls below the predetermined degree, the circuit of the holding coil 19 is again interrupted and, therefore, the relays 29 are again closed.

In order to avoid the installation being operated with the full power of the mains when the demand for heat is small, which would lead to a frequent connection and disconnection of installations having a heavy consumption and would, therefore, lead to undesirable shocks in the mains, the heating elements for the flow heater 4 and the accumulator 7 are subdivided, for example, each into three groups as previously mentioned. Therefore, the circuits of the holding coils or solenoids 34b, 34c of the second and third relays or switches 29b, 29c are provided with switches 35b and 35c respectively which are closed successively or if necessary simultaneously only when the demand for heat is greater. These switches can be in the form of thermostats which are under the influence of the external temperature and which are set to respond at different temperature.

The installation so far described fulfills the condition that the building must be heated in the shortest time without excessive temperatures occurring anywhere while at the same time the temperature desired in the different rooms is automatically maintained. In addition to this, however, it may be desired that the desired room temperature is attained or maintained by limiting the temperature of the water in the radiators. In mild weather, for example, it is more agreeable if the surface temperature of the radiator is permanently only about 45° than if it is temporarily 80°. In order to obtain this result, the holding coils or solenoids 34a, 34b, 34c, of the relays or switches 29a, 29b, 29c can be connected in series with further adjustable thermostats 36a, 36b, 36c, which are mounted at any suitable place in the circulating system and may, for example, consist of immersion controls which, like the control 15, are arranged in the heater 4. Each of these controls is now set to respond at a different temperature. It will now be assumed, for example, that the control 36a opens its contacts at 40°, the control 36b at 45° and the control 36c at 50°. If, after a pause in operation of some time, for example in autumn, one of the thermostats 18a to 18d has opened its contacts, the temperature of the water in the heater 4 will amount to 15 to 20°. Consequently all the three thermostats 36a, 36b, 36c will be closed and all three heating elements 5a, 5b, 5c of the heater 4 will be supplied with current. Since, as has been assumed, however, only one of the thermostats 18a—18d has opened, that is to say too low a temperature exists in only a single room, and with automatic control of the radiator valves only the radiators in the one room are open, the water temperature in the heater 4 will rise very rapidly. As soon as it has reached 40° the immersion control 36a will open and, therefore, disconnect the heating element 5a. The water temperature will still continue to rise but more slowly and finally will cause the control 36b to respond, with the result that the heating element 5b is disconnected at a temperature of 45°. The third heating element 5c now undertakes the heating of the under-heated room alone. If its output is still so great that the water temperature of 50° is exceeded, this third heater 5c will be temporarily disconnected under the action of the thermostat 36c until the temperature of the water has again fallen below 50°. If, on the other hand, the output of the one heater 5c is too small to be able to maintain a water temperature of 45° after the disconnection of the heating element 5b, the heating element 5b will be temporarily connected. This alternating cycle of operations between the controls 36a, 36b and 36c is repeated until the last of the thermostats 18a—18d has again closed its contact.

The controls 36a, 36b, 36c are preferably so designed that the temperature at which they respond can be adjusted as desired.

In the example which has been assumed for the purposes of explanation, that is to say a building having a maximum hourly requirement of heat of 40,000 heat units, a three hour interruption in the consumption of current, a seven to eight hour period of current consumption and a temperature drop of 20°, the accumulator 7 must have a capacity of 27 kilowatts, so that, except for the times when there is no consumption of current, the entire installation consumes a maximum of 45+27=72 kilowatts. Since the accumulator only has to resist the static pressure of the water column which in general does not amount to more than 1 to 1½ atmospheres, it can be made of relatively thin sheet which is preferably welded together in situ and can then be insulated in known manner.

Where I use the term "hydraulically in parallel" or the term "in hydrostatic parallel" in connection with two tanks, I mean two tanks having a common return flow from a hot water heating system and a common feed to the hot water system, whereby at all times the water in one tank is in direct communication with the water in the other tank, and whereby the hydrostatic pressure in both tanks is at all times equal.

I claim:—

1. A heating unit operated by an intermittent electric current and adapted for a hot water heating system comprising a first tank containing water in communication with said heating system, means for electrically heating the water in said first tank, a second tank containing water in communication with said heating system, and means for electrically heating the water in said second tank said second tank being larger than said first tank, said first and said second tanks being in hydrostatic parallel.

2. A heating unit operated by an intermittent electric current and adapted for a hot water heating system comprising a first tank containing water in communication with said heating system, means for electrically heating the water in said first tank, a second tank containing water in communication with said heating system, and means for electrically heating the water in said second tank, said first and said second tank being in hydrostatic parallel, said heating means in said tanks being connected to means adapted to interrupt the supply of electric current for predetermined intervals, said second tank being so dimensioned that the hot water therein, after the interruption of the current supply, is present in amount sufficient to supply the requisite amount of heat units to said system for a predetermined interval without further heat input.

3. A heating unit operated by an intermittent electric current and adapted for a hot water heating system comprising a first tank containing water in communication with said heating system, a plurality of immersion resistance heaters for heating the water in said first tank, a second tank containing water in communication with said heating system, and a plurality of immersion resistance heaters for heating the water in said second tank, said first and said second tanks being in hydrostatic parallel, said resistance heaters in said tanks being connected in parallel to means adapted to interrupt the supply of electric current for predetermined intervals, said second tank being so dimensioned that the hot water therein, after the interruption of the current supply, is present in amount sufficient to supply the requisite amount of heat units to said system for a predetermined interval without further heat input.

4. A heating unit operated by an intermittent electric current and adapted for a hot water heating system comprising a first tank containing water in communication with said heating system, means for electrically heating the water in said first tank, a second tank containing water in communication with said heating system, means for electrically heating the water in said second tank to a temperature different from the temperature of the water in said first tank, and means for automatically controlling a predetermined temperature difference between the respective temperatures of the water prevailing in said tanks, said first and said second tanks being in hydrostatic parallel, said heating means in said tanks being connected to means adapted to interrupt the supply of electric current for predetermined intervals.

5. A heating unit according to claim 4 in which said means for automatically controlling a predetermined temperature difference between the respective temperatures of the water prevailing in said tanks comprises a resistance thermometer in each of said tanks, said resistance thermometers being connected in a Wheatstone bridge circuit, and connected to a solenoid adapted to close the circuit of said electric heating means in said second tank below a predetermined temperature difference, and to open said circuit above a predetermined temperature difference.

6. A heating unit operated by an intermittent electric current and adapted for a hot water heating system comprising a first tank containing water in communication with said heating system, a plurality of immersion resistance heaters for heating the water in said first tank, a second tank containing water in communication with said heating system, a plurality of immersion resistance heaters for heating the water in said second tank to a temperature different from the temperature of the water in said first tank, and means for automatically controlling a predetermined temperature difference between the respective temperatures of the water prevailing in said tanks, said first and said second tanks being in hydrostatic parallel, said resistance heaters in said tanks being connected in parallel to means adapted to interrupt the supply of electric current for predetermined intervals, said second tank being so dimensioned that the hot water therein, after the interruption of the current supply, is present in amount sufficient to supply the requisite amount of heat units to said system for a predetermined interval without further heat input.

7. A heating unit according to claim 6 in which said means for automatically controlling a predetermined temperature difference between the respective temperatures of the water prevailing in said tanks comprises a resistance thermometer in each of said tanks, said resistance thermometers being connected in a Wheatstone bridge circuit and connected to a solenoid adapted to close the circuit of said electric heating means in said second tank below a predetermined temperature difference, and to open said circuit above a predetermined temperature difference.

8. A heating unit operated by an intermittent electric current and adapted for a hot heating system comprising a first tank containing water in communication with said heating system, means for electrically heating the water in said first tank, a second tank containing water in communication with said heating system, means for electrically heating the water in said second tank to a temperature different from the temperature of the water in said first tank, a valve in the return flow to said second tank, said valve being closed while the heating circuit of the heating means in said second tank is closed and being opened while the circuits of the heating means in both tanks are broken, and means for automatically controlling a predetermined temperature difference between the respective temperatures of the water prevailing in said tanks, said first and said second tanks being in hydrostatic parallel, said heating means in said tanks being connected to means adapted to interrupt the supply of electric current for predetermined intervals.

9. A heating unit according to claim 8 in which said means for automatically controlling a predetermined temperature difference between the respective temperatures of the water prevailing in said tanks comprises a resistance thermometer in each of said tanks, said resistance thermometers being connected in a Wheatstone bridge circuit and connected to a solenoid adapted to close the circuit of said electric heating means in said second tank below a predetermined temperature difference, and to open said circuit above a predetermined temperature difference.

10. A heating unit operated by an intermittent electric current and adapted for a hot water heating system comprising a first tank containing water in communication with said heating system, a plurality of immersion resistance heaters for heating the water in said first tank, a second tank containing water in communication with said heating system, a plurality of immersion resistance heaters for heating the water in said second tank to a temperature different from the temperature of the water in said first tank, a valve in the return flow to said second tank, said valve being closed while the heating circuit of at least one of the heaters in said second tank is closed and being opened while the circuits of the heaters in both tanks are broken, and means for automatically controlling a predetermined temperature difference between the respective temperatures of the water prevailing in said tanks, said first and said second tanks being in hydrostatic parallel, said resistance heaters in said tanks being connected in parallel to means adapted to interrupt the supply of electric current for predetermined intervals, said second tank being so dimensioned that the hot water therein, after the interruption of the current supply, is present in amount sufficient to supply the requisite amount of heat units to said system for a predetermined interval without further heat input.

11. A heating unit according to claim 10 in which said means for automatically controlling a predetermined temperature difference between the respective temperatures of the water prevailing in said tanks comprise a resistance thermometer in each of said tanks, said resistance thermometers being connected in a Wheatstone bridge circuit and connected to a solenoid adapted to close the circuit of said electric heating means in said second tank below a predetermined temperature difference, and to open said circuit above a predetermined temperature difference.

12. A heating unit operated by an intermittent electric current and adapted for a hot water heating system comprising a first tank containing water in communication with said heating system, means for electrically heating the water in said first tank, a second tank containing water in communication with said heating system, means for electrically heating the water in said second tank, a plurality of thermostatic room temperature control means connected in series and adapted to break the heating circuit of the heating means in said first tank above a predetermined temperature and to close said circuit below a predetermined temperature, said first and said second tank being in hydrostatic parallel, said heating means in said tanks being connected to means adapted to interrupt the supply of electric current for predetermined intervals.

13. A heating unit according to claim 12 in which each of said thermostatic room temperature control means is connected in an independent circuit with electromagnetically actuated radiator valves.

14. A heating unit operated by an intermittent electric current and adapted for a hot water heating system comprising a first tank containing water in communication with said heating system, a plurality of immersion resistance heaters for heating the water in said first tank, a second tank containing water in communication with said heating system, a plurality of immersion resistance heaters for heating the water in said second tank, a plurality of thermostatic room temperature control means connected in series and adapted to break the heating circuit of the heaters in said first tank above a predetermined temperature and to close said circuits below a predetermined temperature, said first and said second tanks being in hydrostatic parallel, said resistance heaters in said tanks being connected in parallel to means adapted to interrupt the supply of electric current for predetermined intervals, said second tank being so dimensioned that the hot water therein, after the interruption of the current supply, is present in amount sufficient to supply the requisite amount of heat units to said system for a predetermined interval without further heat input.

15. A heating unit in accordance with claim 14 in which each of said thermostatic room temperature control means is connected in an independent circuit with electromagnetically actuated radiator valves.

16. In a hot water heating system operated by an intermittent electric current, the combination comprising a first tank containing water in communication with said heating system, a plurality of individual heating circuits, each of said heating circuits containing at least one heating element for heating the water in said first tank, a plurality of hot water temperature control means located at different points of said heating system, each of said control means controlling at least one of said heating elements by breaking its circuit above a predetermined temperature and closing said circuit below a predetermined temperature, a second tank containing water in communication with said heating system and a plurality of individual heating circuits, each of said circuits containing at least one heating element for heating the water in said second tank, said first and said second tanks being in hydrostatic parallel, said circuits in said tanks being connected to means adapted to interrupt the supply of electric current for predetermined intervals.

17. The combination according to claim 16 in which each of said hot water temperature control means is responsive to a different predetermined temperature.

18. In a hot water heating system operated by an intermittent electric current, the combination comprising a first tank containing water in communication with said heating system, a plurality of individual heating circuits, each of said heating circuits containing at least one heating element for heating the water in said first tank, a plurality of hot water temperature control means located at different points of said heating system, each of said control means controlling at least one of said heating elements by breaking its circuit above a predetermined temperature and closing said circuit below a predetermined temperature, a second tank containing water in communication with said heating system, a plurality of individual heating circuits, each of said heating circuits containing at least one heating element for heating the water in said second tank to a temperature different from the temperature of the water in said first tank, a valve in the return flow to said second tank, said valve being closed while the heating circuit of at least one of the heating elements in said second tank is closed and being opened while all of the heating circuits in said tanks are broken, and means for automatically controlling a predetermined temperature difference between the respective temperatures of the water prevailing in said tanks, said first and said second tanks being in hydrostatic parallel, said heating circuits in said tanks being connected to means adapted to interrupt the supply of electric current for predetermined intervals.

19. The combination according to claim 18 in which each of said hot water temperature control means is responsive to a different predetermined temperature.

20. In a hot water heating system operated by an intermittent electric current, the combination comprising a first tank containing water in communication with said heating system, a plurality of individual heating circuits, each of said heating circuits containing at least one heating element for heating the water in said first tank, a plurality of hot water temperature control means located at different points of said heating system, each of said control means controlling at least one of said heating elements by breaking its circuit above a predetermined temperature and closing said circuit below a predetermined temperature, a second tank containing water in communication with said heating system, and a plurality of individual heating circuits, each of said heating circuits containing at least one heating element for heating the water in said second tank, said heating circuits in said tanks being connected in parallel to means adapted to interrupt the supply of electric current for predetermined intervals, at least one of said heating circuits being provided with individual thermostatic control means closing said circuit below a predetermned temperature and breaking said circuit above a predetermined temperature, said first and said second tanks being in hydrostatic parallel.

21. The combination according to claim 20 in which each of said hot water temperature control means is responsive to a different predetermined temperature and in which at least two of said heating circuits are each provided with a thermostat, each thermostat being responsive to a different predetermined external air temperature.

22. In a hot water heating system operated by an intermittent electric current, the combination comprising a first tank containing water in communication with said heating system, a plurality of individual heating circuits, each of said heating circuits containing at least one heating element for heating the water in said first tank, a plurality of hot water temperature control means located at different points of said heating system, each of said control means controlling at least one of said heating elements by breaking its circuit above a predetermined temperature and closing said circuit below a predetermined temperature, a second tank containing water in communication with said heating system, a plurality of individual heating circuits, each of said heating circuits containing at least one heating element for heating the water in said second tank to a temperature different from the temperature of the water in said first tank, a valve in the return flow to said second tank, said valve being closed while the heating circuit of at least one of the heating elements in said second tank is closed and being opened while all of the heating circuits in said tanks are broken, and means for automatically controlling a predetermined temperature difference between the respective temperatures of the water prevailing in said tanks, said heating circuits being connected in parallel to means adapted to interrupt the supply of electric current for predetermined intervals, at least one of said heating circuits being provided with individual thermostatic control means closing said circuit below a predetermined temperature and breaking said circuit above a predetermined temperature, said first and said second tanks being in hydrostatic parallel.

23. The combination according to claim 22 in which each of said hot water temperature control means is responsive to a different temperature and in which at least two of said heating circuits are each provided with a thermostat, each thermostat being responsive to a different predetermined external air temperature.

24. In a hot water heating system operated by an intermittent electric current, the combination comprising a first tank containing water in communication with said heating system, a plurality of individual heating circuits, each of said heating circuits containing at least one heating element for heating the water in said first tank, a plurality of hot water temperature control means located at different points of said heating system, each of said control means controlling at least one of said heating elements by breaking its circuit above a predetermined temperature and closing said circuit below a predetermined temperature, a plurality of thermostatic room temperature control means connected in series and adapted to break the heating circuits of the heating elements in said first tank above a predetermined temperature and to close said circuits below a predetermined temperature, a second tank containing water in communication with said heating system, a plurality of individual heating circuits, each of said heating circuits containing at least one heating element for heating the water in said second tank, said first and said second tank being in hydrostatic parallel, said heating circuits in said first and said second tank being connected in parallel to means adapted to interrupt the supply of electric current for predetermined intervals, at least one of said heating circuits being provided with individual thermostatic control means closing said circuit below a predetermined temperature and breaking said circuits above a predetermined temperature, said first and said second tank being hydrostatic parallel.

25. The combination according to claim 24, in which each of said hot water temperature control means is responsive to a different temperature and in which at least two of said heating circuits are each provided with a thermostat, each thermostat being responsive to a different predetermined external air temperature.

26. In a hot water heating system operated by an intermittent electric current, the combination comprising a first tank containing water in communication with said heating system, a plurality of individual heating circuits, each of said heating circuits containing at least one heating element for heating the water in said first tank, a plurality of hot water temperature control means located at different points of said heating system, each of said control means controlling at least one of said heating elements by breaking its circuit above a predetermined temperature and closing said circuit below a predetermined temperature, a plurality of thermostatic room temperature control means connected in series and adapted to break the heating circuits of the heating elements in said first tank above a predetermined temperature, and to close said circuits below a predetermined temperature, a second tank containing water in communication with said heating system, a plurality of individual heating circuits, each of said heating circuits containing at least one heating element for heating the water in said second tank to a temperature different from the temperature of the water in said first tank, a valve in the return flow to said second tank, said valve being closed, while the heating circuit of at least one of the heating elements in said second tank is closed, and being opened while all of the heating circuits in said tanks are broken, and means for automatically controlling a predetermined temperature difference between the respective temperatures of the water prevailing in said tanks, said heating circuits being connected in parallel to means adapted to interrupt the supply of electric current for predetermined intervals, at least one of said heating circuits being provided with individual thermostatic control means, closing said circuit below a predetermined temperature, and breaking said circuit above a predetermined temperature, said first and said second tanks being in hydrostatic parallel.

27. The combination in accordance with claim 26 in which said means for automatically controlling a predetermined temperature difference between the respective temperatures of the water prevailing in said tanks comprise a resistance thermometer in each of said tanks, said resistance thermometers being connected in a Wheatstone bridge circuit and connected to a solenoid adapted to close the circuits of the heating elements in said second tank below a predetermined temperature difference, and to open said circuits above a predetermined temperature difference, in which each of said thermostatic room temperature control means is connected in an independent circuit with electro-magnetically actuated radiator valves, in which each of said hot water temperature control means is responsive to a different predetermined temperature, and in which at least two of said heating circuits are each provided with a thermostat, each thermostat being responsive to a different predetermined external air temperature.

28. In a heating unit operated by an intermittent electric current and adapted for a hot water heating system, a tank adapted to contain water in communication with said heating system, means for electrically heating water in said tank, said heating means in said tank being connected to means adapted to interrupt the supply of electric current for predetermined intervals, said tank being adapted to discharge, after the interruption of the current supply, hot water in amount sufficient to supply the requisite amount of heat units to said system for a predetermined interval without further heat input.

29. A heating unit operated by an intermittent electric current and adapted for a hot water heating system comprising a first tank adapted to contain water in communication with said heating system, means for electrically heating water in said first tank, a second tank adapted to contain water in communication with said heating system and means for electrically heating water in said second tank, said heating means in said tanks being connected to means adapted to interrupt the supply of electric current for predetermined intervals, said first tank being adapted to discharge, for the period of current supply, hot water in amount sufficient to supply the requisite amount of heat units to said system during said period, said second tank being adapted to discharge, after the interruption of the current supply, hot water in amount sufficient to supply the requisite amount of heat units to said system for said predetermined intervals without further heat input.

30. A heating unit according to claim 29 in which said first and said second tanks are in hydrostatic parallel.

WALTER von SAUER.

CERTIFICATE OF CORRECTION.

Patent No. 2,046,008. June 30, 1936.

WALTER von SAUER.

It is hereby certified that error appears in the printed specification of the above numbered patent requiring correction as follows: Page 2, first column, lines 21 and 24, for the word "substituting" read constituting; page 7, first column, line 38, claim 24, after "being" insert in; and that the said Letters Patent should be read with these corrections therein that the same may conform to the record of the case in the Patent Office.

Signed and sealed this 8th day of September, A. D. 1936.

Leslie Frazer (Seal) Acting Commissioner of Patents.